United States Patent [19]
Attix

[11] Patent Number: 5,526,388
[45] Date of Patent: Jun. 11, 1996

[54] DEBRIS RESISTANT FUEL ROD SLEEVE

[75] Inventor: Douglas J. Attix, Lynchburg, Va.

[73] Assignee: B&W Fuel Company, Lynchburg, Va.

[21] Appl. No.: 368,572

[22] Filed: Jan. 4, 1995

[51] Int. Cl.⁶ .................................................. G21C 3/34
[52] U.S. Cl. .......................... 376/440; 376/352; 376/313; 376/434; 376/443; 376/457
[58] Field of Search ........................................ 376/440, 352, 376/313, 434, 443, 457; 976/DIG. 264

[56] References Cited

U.S. PATENT DOCUMENTS

| | | | |
|---|---|---|---|
| 4,273,616 | 6/1981 | Andrews | 376/420 |
| 4,652,425 | 3/1987 | Ferrari et al. | 376/352 |
| 4,664,880 | 5/1987 | Bryan | 376/352 |
| 4,678,627 | 7/1987 | Rylatt | 376/313 |
| 4,684,495 | 8/1987 | Wilson et al. | 376/352 |
| 4,684,496 | 8/1987 | Wilson et al. | 376/352 |
| 4,828,791 | 5/1989 | DeMario | 376/352 |
| 4,900,507 | 2/1990 | Shallenberger et al. | 376/352 |
| 4,980,121 | 12/1990 | Roberts et al. | 376/439 |
| 5,009,839 | 4/1991 | King | 376/352 |
| 5,037,605 | 8/1991 | Riordan | 376/352 |
| 5,094,802 | 3/1992 | Riordan | 376/352 |
| 5,361,287 | 11/1994 | Williamson | 376/352 |

Primary Examiner—Donald P. Walsh
Assistant Examiner—Meena Chelliah
Attorney, Agent, or Firm—Robert J. Edwards; D. Neil LaHaye

[57] ABSTRACT

A debris resistant fuel rod sleeve that is received over the lower end of a fuel rod. The sleeve extends above the top of the lowermost spacer grid. Openings are spaced apart around the circumference of the sleeve to correspond to the location of hard stops in the spacer grid. The hard stops are received in the openings and retain the sleeves in position during operation and during reconstitution or recaging if necessary. The outboard side of the peripheral sleeves may be provided with top and bottom lead-in features to prevent hang-ups.

2 Claims, 1 Drawing Sheet

DEBRIS RESISTANT FUEL ROD SLEEVE

BACKGROUND OF THE INVENTION

1. Field of the Invention

The invention is generally related to a nuclear reactor fuel assembly and more particularly to debris filters used in fuel assemblies.

2. General Background

Commercial nuclear reactors include multiple fuel assemblies. Each fuel assembly is comprised of a number of fuel rods radially spaced apart in a parallel array by grid assemblies spaced along the length of the fuel rods. Each grid assembly is formed in an eggcrate design by multiple metal strips that criss-cross at right angles to form individual cells for each of the fuel rods. The strips are provided with tabs that project into the cells against the fuel rods. The tabs serve the purposes of holding the fuel rods in their respective radial positions and providing maximum surface area contact of the fuel rods with coolant flowing through the cells. Control rod guide thimble tubes also extend through selected cells in the grid assembly and are attached at their upper and lower ends respectively to an upper end fitting and a lower end fitting. The upper and lower end fittings are also commonly referred to in the industry as nozzle plates since they are rigid plates that provide structural integrity and load bearing support to the fuel assembly and are provided with flow apertures therethrough for coolant flow. The lower end fitting or nozzle plate is positioned directly above openings in the lower portion of the reactor where coolant flows up into the reactor to the core. The ligaments between apertures in the end fittings coincide with the ends of the fuel rods and limit upward or downward movement of the fuel rods. Debris such as metal particles, chips, and turnings is generated during manufacture, installation, and repair of the reactor, piping, and associated cooling equipment. The size and complexities of the equipment prevent location and removal of all such debris before operations are commenced. Also, some of this debris may not become loose matter in the system until the system is put into operation. It has been recognized that this debris presents a greater problem to the system than previously thought. These small pieces of debris have been found to lodge between the walls of the grid cells and the fuel rods. Movement and vibration of the lodged debris caused by coolant flow results in abrasion and removal of cladding on the fuel rods. This in turn leads to detrimental effects such as corrosion of the fuel rods and failure to retain radioactive fission gas products. Such damage, although not critical to safety of the surrounding environment, can reduce operating efficiency by the need to suspend operation while replacing damaged fuel rods. One approach to stopping debris from travelling up into the clad area of the fuel rods has been to use the lower end fitting as a debris filter. Another approach has been to use the standard lowermost spacer grid or a special anti-debris grid structure to catch or stop the upward movement of debris. However, to prevent fretting failures of the fuel rods in this area, the fuel rod must have a solid cross section. This is accomplished by using a longer than normal lower end plug in the fuel rod. This approach includes the disadvantages of increased expense and reduced fuel rod plenum volume which adversely affects the duration of fuel rod burnup. It can be seen that a need exists for a debris filter capable of filtering debris of a size which may lodge between the grid cell walls and the fuel rods. An important consideration besides that of filtration is that a substantial coolant pressure drop across the filter must be avoided in order to maintain an adequate coolant flow over the fuel rods for heat removal therefrom.

SUMMARY OF THE INVENTION

The invention addresses the above need. What is provided is a debris resistant fuel rod sleeve that is received over the lower end of a fuel rod. The sleeve extends above the top of the lowermost spacer grid. Openings are spaced apart around the circumference of the sleeve to correspond to the location of hard stops in the spacer grid. The hard stops are received in the openings and retain the sleeves in position during operation and during reconstitution or recaging if necessary. The outboard side of the peripheral sleeves may be provided with top and bottom lead in features to prevent hang-ups.

BRIEF DESCRIPTION OF THE DRAWINGS

For a further understanding of the nature and objects of the present invention reference should be had to the following description, taken in conjunction with the accompanying drawing in which like parts are given like reference numerals, and wherein.

DETAILED DESCRIPTION OF THE PREFERRED EMBODIMENT

Figure 2:
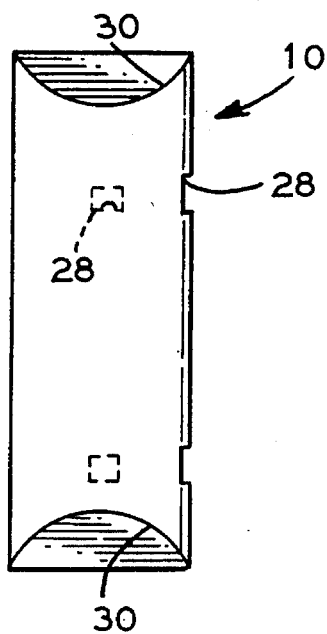
FIG. 2 is a side view of peripheral sleeves of the invention.

Referring to the drawings, it is seen in FIG. 2 that the invention is generally indicated by the numeral 10. The invention is generally comprised of a sleeve 12 sized to fit over a fuel rod in a nuclear fuel assembly.

Figure 1:
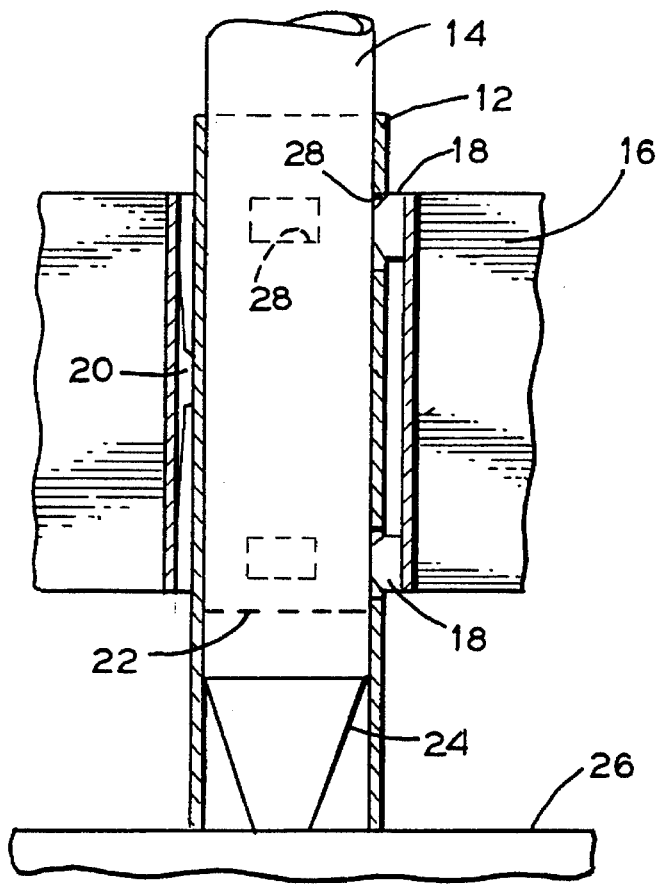
FIG. 1 is a side sectional view of a portion of a nuclear fuel assembly with the invention installed on a fuel rod.

For ease of illustration, FIG. 1 illustrates only the relevant portion of a nuclear fuel assembly. Fuel rod 14 is received in one of the cells defined by lowermost spacer grid 16. Although only one spacer grid is shown, it should be understood that a plurality of spacer grids are normally spaced apart along the length of the fuel rods. Each cell of spacer grid 16 is provided with one or more hard stops 18 and one or more soft stops 20 that position fuel rod 14 in the cell for minimal contact with the spacer grid and maximum coolant flow contact across the fuel rod. As indicated by numeral 22, lower end cap 24 is welded to the lower end of fuel rod 14. Lower end cap 24 may rest upon lower end fitting 26.

Figure 3:
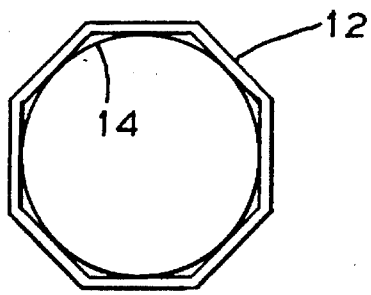
FIG. 3 is a top view of one embodiment of the invention installed on a fuel rod.

Sleeve 12 is shown in FIG. 1 installed on a nuclear fuel rod 14 of a nuclear fuel assembly. Sleeve 12 is provided with a plurality of openings 28 therethrough spaced around the circumference of sleeve 12 that correspond to the location of hardstops 18 in the cells in spacer grid 16. Openings 28 are sized to receive hardstops 18 such that they bear against fuel rod 14 and, in addition to retaining fuel rod 14 in position, also retain sleeve 12 in its installed position on fuel rod 14. As seen in FIG. 2, for sleeves 12 that are used in the outboard cells of spacer grid 16, a portion of the circumference of either or both ends of sleeve 12 may be tapered inwardly toward the longitudinal center of sleeve 12 as indicated by numeral 30. Only the portion of sleeve 12 that faces the outboard portion of spacer grid 16 need be provided with tapered portion 30. This serves as a lead-in feature to prevent the fuel rod 14 and sleeve 12 from hanging up during insertion of the fuel assembly into the reactor core. As illustrated in FIG. 3, sleeve 12 may be of any suitable shape such as circular, square, or octagonal. The walls of sleeve 12 may be rigid or flexible. In the preferred embodiment, sleeve 12 is sized such that its upper end extends at least to the upper surface of lowermost spacer grid 16 or higher and has a lower end which at least substantially coincides with the joint between lower end cap 24 and fuel rod 14 and may extend down to lower end fitting 26. It is important that the lower end of sleeve 12 coincide with lower end cap 24 so that any debris captured therebetween will contact lower end cap 24 and not the cladding on the fuel rod. Sleeve 12 is preferably very thin so as to have minimal effect on coolant flow and is also made from a wear resistant material suitable for the operating conditions that are encountered in a nuclear reactor.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. In a nuclear fuel assembly having a plurality of fuel rods held in a spaced apart array above a lower end fitting by a plurality of spacer grids along the length of the fuel rods, with each spacer grid defining a plurality of cells that each receive one fuel rod and with each cell having at least one hard stop, a debris resistant fuel rod sleeve, comprising a sleeve received over the lower end of a fuel rod and extending above the top of the lowermost spacer grid and down to the lower end fitting, said sleeve having a plurality of openings therethrough spaced around the circumference of said sleeve that receive the hardstops of the spacer grid.

2. The debris resistant fuel rod sleeve of claim 1, wherein said sleeve is provided with a portion of the circumference of at least one end of sleeve being tapered inwardly toward the longitudinal center of said sleeve.

\* \* \* \* \*